US009053604B2

(12) United States Patent
Sylla

(10) Patent No.: US 9,053,604 B2
(45) Date of Patent: Jun. 9, 2015

(54) TRUSTED INITIALIZATION FOR WAGERING GAME MACHINES

(75) Inventor: Craig J. Sylla, Round Lake, IL (US)

(73) Assignee: WMS Gaming, Inc., Waukegan, IL (US)

( * ) Notice: Subject to any disclaimer, the term of this patent is extended or adjusted under 35 U.S.C. 154(b) by 15 days.

(21) Appl. No.: 13/532,455

(22) Filed: Jun. 25, 2012

(65) Prior Publication Data

US 2012/0264508 A1 Oct. 18, 2012

Related U.S. Application Data

(63) Continuation of application No. 12/595,465, filed as application No. PCT/US2008/064025 on May 17, 2008, now Pat. No. 8,226,471.

(60) Provisional application No. 60/939,244, filed on May 21, 2007.

(51) Int. Cl.
*G06F 17/00* (2006.01)
*G07F 17/32* (2006.01)

(52) U.S. Cl.
CPC .................................... *G07F 17/323* (2013.01)

(58) Field of Classification Search
USPC ...................................................... 463/16–25
See application file for complete search history.

(56) References Cited

U.S. PATENT DOCUMENTS 6,527,638 B1 3/2003 Walker et al.
6,676,522 B2 1/2004 Rowe et al.
6,908,391 B2 6/2005 Gatto et al.
7,491,122 B2 * 2/2009 Ryan ................................ 463/29
7,749,076 B2 7/2010 Morrow
7,831,047 B2 * 11/2010 Rowe ............................ 380/251
8,317,607 B2 * 11/2012 Shimabukuro et al. .......... 463/29
2002/0049909 A1 4/2002 Jackson et al.
2004/0083355 A1 4/2004 Smith et al.
2004/0242328 A1 12/2004 Blackburn et al.
2004/0243849 A1 12/2004 Blackburn et al.
2004/0259633 A1 12/2004 Gentles et al.
2004/0266523 A1 12/2004 Gentles et al.
2004/0266533 A1 12/2004 Gentles et al.

(Continued)

FOREIGN PATENT DOCUMENTS

WO WO-2008147742 12/2009

OTHER PUBLICATIONS

"PCT Application No. PCT/US2008/064025 International Search Report", Sep. 3, 2008, 12 pages.

(Continued)

*Primary Examiner* — Ronald Laneau
(74) *Attorney, Agent, or Firm* — DeLizio Law, PLLC

(57) ABSTRACT

Systems and methods for trusted initialization of wagering game machines are described herein. In some embodiments, a method includes receiving, from a wagering game machine, a request for an operating system image that includes a first component for booting the wagering game machine. The method can also include transmitting the operating system image to the wagering game machine, wherein the operating system image also includes a second component for procuring software that authenticates content on the wagering game machine. Additionally, the method can include receiving a request for the software that authenticates content on the wagering game machine and transmitting the software that authenticates content on the wagering game machine.

17 Claims, 6 Drawing Sheets

(56) References Cited

U.S. PATENT DOCUMENTS

| | | | | |
|---|---|---|---|---|
| 2005/0180326 | A1 | 8/2005 | Goldflam et al. | |
| 2007/0021198 | A1 | 1/2007 | Muir et al. | |
| 2007/0129145 | A1 | 6/2007 | Blackburn et al. | |
| 2007/0173322 | A1 | 7/2007 | Swamy et al. | |
| 2010/0120529 | A1 * | 5/2010 | Shimabukuro et al. | 463/29 |
| 2010/0130287 | A1 * | 5/2010 | Dasgupta | 463/44 |
| 2010/0203955 | A1 | 8/2010 | Sylla | |
| 2010/0234101 | A1 | 9/2010 | Morrow et al. | |

OTHER PUBLICATIONS

"U.S. Appl. No. 12/595,465 Office Action", Jun. 10, 2011, 18 pages.

"U.S. Appl. No. 12/595,465 Office Action", Nov. 4, 2011, 5 pages.

* cited by examiner

TRUSTED INITIALIZATION FOR WAGERING GAME MACHINES

RELATED APPLICATIONS

This application claims priority to, and is a continuation application of, U.S. application Ser. No. 12/595,465, filed on Oct. 9, 2009. The Ser. No. 12/595,465 application claims priority benefit of PCT Application No. PCT/US2008/064025, filed on May 17, 2008, which claims benefit to U.S. Provisional Application No. 60/939,244 filed on May 21, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, WMS Gaming, Inc.

FIELD

Embodiments of the inventive subject matter relate generally to wagering game systems, and more particularly to security for trusted initialization for wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes an example operating environment. The third section describes example operations performed by some embodiments and the fourth section describes example wagering game machines in more detail. The fifth section presents some general comments.

Introduction

This section provides an introduction to some embodiments of the invention. Wagering game machines are typically large stationary devices. However, some wagering game machines are lightweight handheld devices designed for mobility. This mobility enables players to play wagering games in a wide variety of casino settings, such as by a pool, in a sports book, in a restaurant, etc.

Figure 1:
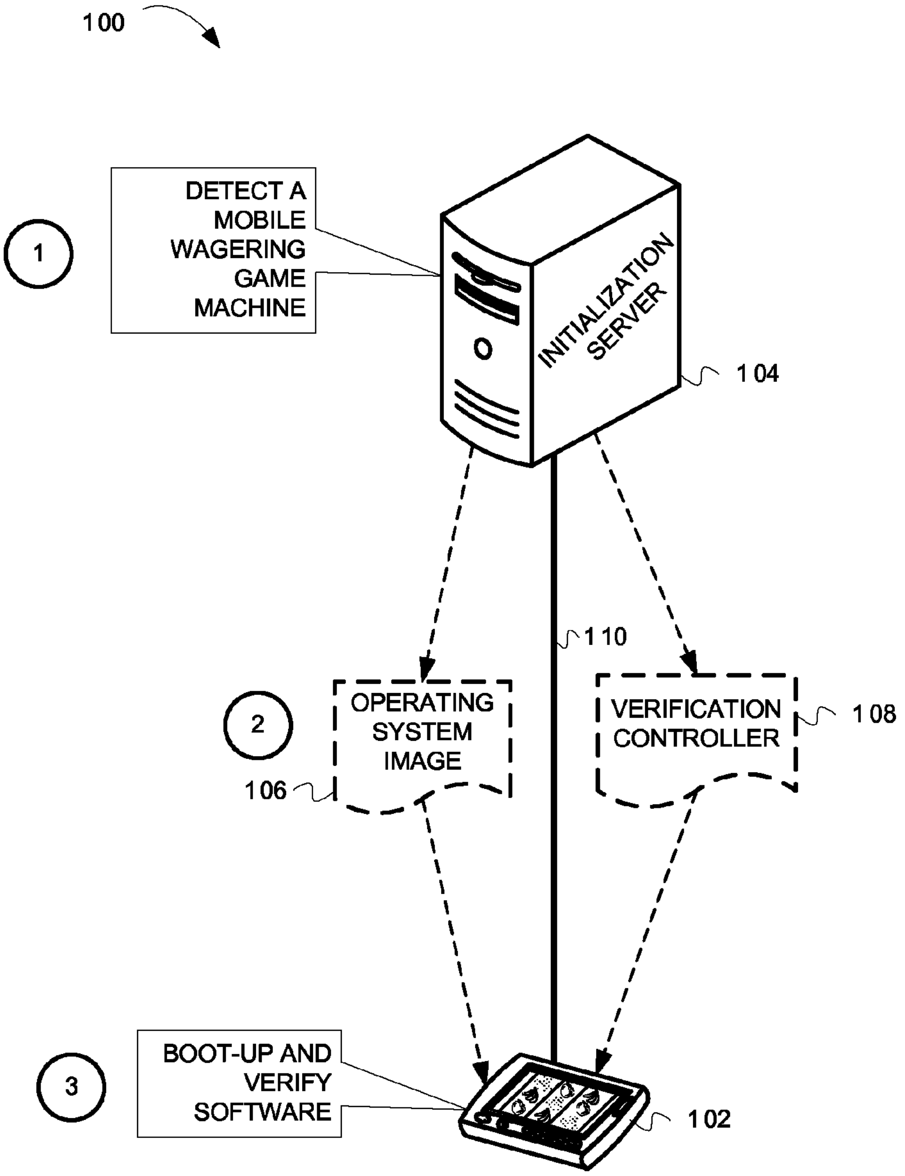
FIG. 1 is a dataflow diagram illustrating dataflow and operations for initializing a mobile machine over a secure network connection, according to some embodiments of the invention.

Mobile wagering game machines (hereinafter "mobile machines") may be exposed to security risks not common to their stationary counterparts. For example, attackers can move mobile machines to clandestine locations that are free of casino security. Absent casino security, attackers can attempt to modify mobile machines with relative impunity. Attackers can use modified wagering game machines to commit fraud and/or perform other rouge operations. However, some embodiments of the invention make mobile machines more resistant to attack. For example, according to some embodiments, the mobile machines cannot play wagering games without first booting and initializing with content received from a trusted server over a physically secure network connection. Network booting and initialization reduces the mobile machines' storage needs, simplifies distribution of booting and initialization content (e.g., the content can be stored on one server instead of many mobile machines), and allows mobile machines to boot and initialize without having special embedded initialization logic. Additionally, network booting and initialization can be used to establish a chain of trust that begins at a secure trusted server and extends to mobile machines on a casino floor. FIG. 1 describes these concepts in more detail.

FIG. 1 is a dataflow diagram illustrating dataflow and operations for initializing a mobile machine over a secure network connection, according to some embodiments of the invention. In FIG. 1, a wagering game network 100 includes a mobile machine 102 connected to an initialization server 104 over a physically secure network connection 110. The mobile machine 102 includes content for presenting wagering games, but is configured to boot only with an operating system image received over the secure network connection 110. The secure network connection 110 can be an Ethernet cable physically secured in a locked room or other physically secure area. The dataflow and operations occur in three stages.

During stage one, the initialization server 104 detects that the mobile machine 102 is connected to the secure network connection 110. During stage two, the initialization server 104 transmits an operating system image 106 and a verification controller 108 to the mobile machine 102. During stage three, the mobile machine 102 uses the operating system image 106 to boot and the verification controller 108 to verify all content stored on the mobile machine 102. If all content is verified as authentic, the mobile machine 102 can connect to a wireless network (not shown) and begin presenting wagering games. Otherwise, the mobile machine 102 can lock-out all users, preventing potential rogue operations.

Although FIG. 1 describes some embodiments, the following sections describe many other features and embodiments.

Operating Environment

This section describes an example operating environment and provides structural aspects of some embodiments. This section includes discussion about wagering game machines and wagering game networks.

Wagering Game Networks

Figure 2:
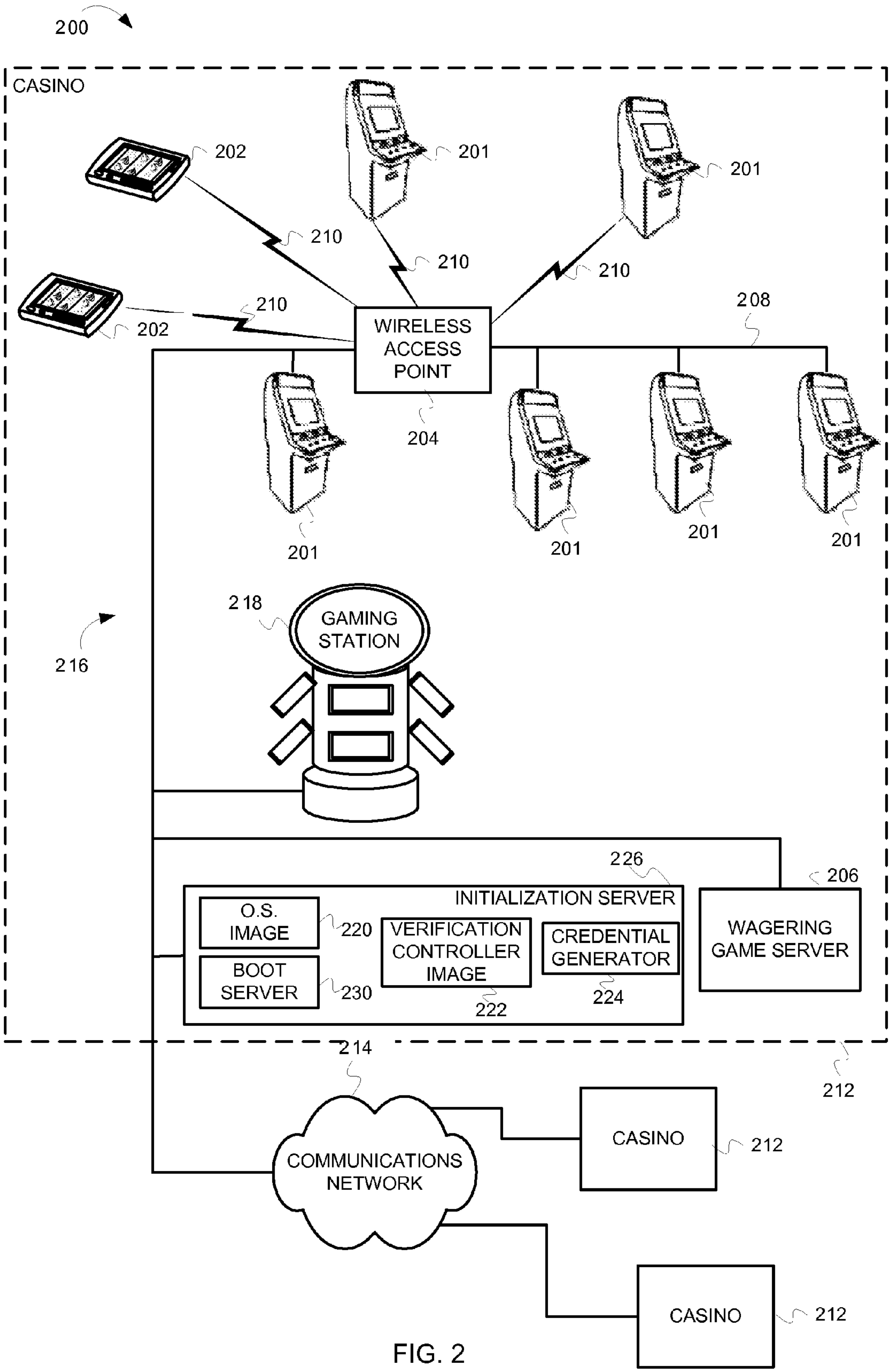
FIG. 2 is a block diagram illustrating a wagering game network 200, according to example embodiments of the invention.

FIG. 2 is a block diagram illustrating a wagering game network 200, according to example embodiments of the invention. As shown in FIG. 2, the wagering game network 200 includes a plurality of casinos 212 connected to a communications network 214.

Each casino 212 includes a local area network 216, which includes an access point 204, wagering game machines (201 & 202), gaming station 218, wagering game server 206, and initialization server 226. The access point 204 provides wireless communication links 210 and wired communication links 208. The wired and wireless communication links can employ any suitable connection technology, such as Bluetooth, 802.11, Ethernet, public switched telephone networks, SONET, etc. In some embodiments, the wired communication links 208 (and other LAN components) are physically secured against unauthorized access.

The wagering game machines described herein can take any suitable form, such as stationary floor models 201 (hereinafter "stationary machines"), handheld mobile models (i.e., mobile machines), bartop models, workstation-type console models, etc. Moreover, any of the wagering game machines can be primarily dedicated for use in conducting wagering games, or they can include non-dedicated devices, such as mobile phones, personal digital assistants, personal computers, etc.

In some embodiments, players check-out mobile machines 202 from the gaming station 218, which can securely store, recharge, and connect the mobile machines 202 to the initialization server 226. While residing in the gaming station 218, the mobile machines 202 can perform an initialization process before they are removed. In some embodiments, as part of the initialization process, the mobile machines 202 can: 1) boot using operating systems received from the initialization server 226, and 2) verify wagering game content using a verification controllers received from the initialization server 226. After the mobile machines 202 initialize over a secure connection with components from a trusted source (i.e., initialization server 226), they can present wagering games. In some embodiments, the mobile machines 202 can connect to the initialization server 226 and initialize without the gaming station 218 (e.g., an attendant can plug the mobile machine 202 into a secure network connection).

The initialization server 226 includes a boot server 230, operating system image 220, verification controller image 222, and credential generator 224. In some embodiments, the boot server 230 connects to wagering game machines 201 & 202 so it can transmit copies of the operating system image 220. In some embodiments the boot server 230 can be configured to process network boot requests as defined in Intel Corporation's Preboot Execution Environment (PXE) standard. The initialization server's operating system image 220 can include any suitable operating system, such as one or more versions of Linux, UNIX, Windows, etc. The verification controller image 222 can include software for verifying authenticity of content on a wagering game machine. In some embodiments, the images 220 & 222 include digital signatures for verifying their authenticity. The credential generator 224 can generate credentials (e.g., digital certificates, passwords, etc.) for use by the wagering game machines 201 & 202 when they present wagering games and other content.

The wagering game server 206 can serve wagering games and distribute content to the wagering game machines 201 & 202. The wagering game machines 201 & 202 can operate as thin, thick, or intermediate clients. For example, one or more elements of game play may be controlled by the wagering game machine 201 & 202 (client) or the wagering game server 206 (server). Game play elements can include executable game code, lookup tables, configuration files, game outcome, audio or visual representations of the game, game assets or the like. In a thin-client example, the wagering game server 206 can perform functions such as determining game outcome or managing assets, while the wagering game machine 201 & 202 can present a graphical representation of such outcome or asset modification to the user (e.g., player). In a thick-client example, the wagering game machines 201 & 202 can determine game outcomes and communicate the outcomes to the wagering game server 206 for recording or managing a player's account.

In some embodiments, either the wagering game machines 201 & 202 (client) or the wagering game server 206 can provide functionality that is not directly related to game play. For example, account transactions and account rules may be managed centrally (e.g., by the wagering game server 206) or locally (e.g., by a wagering game machine 201/202). Other functionality not directly related to game play may include power management, presentation of advertising, software or firmware updates, system quality checks, etc.

In some embodiments, the wagering game network 200 can include other network devices, such as accounting servers, wide area progressive servers, player tracking servers, and/or other devices suitable for use in connection with embodiments of the invention. Any of the wagering game network components (e.g., the wagering game machines 201 & 202) can include hardware and machine-readable media including instructions for performing the operations described herein.

Wagering Game Machine Architecture

Figure 3:
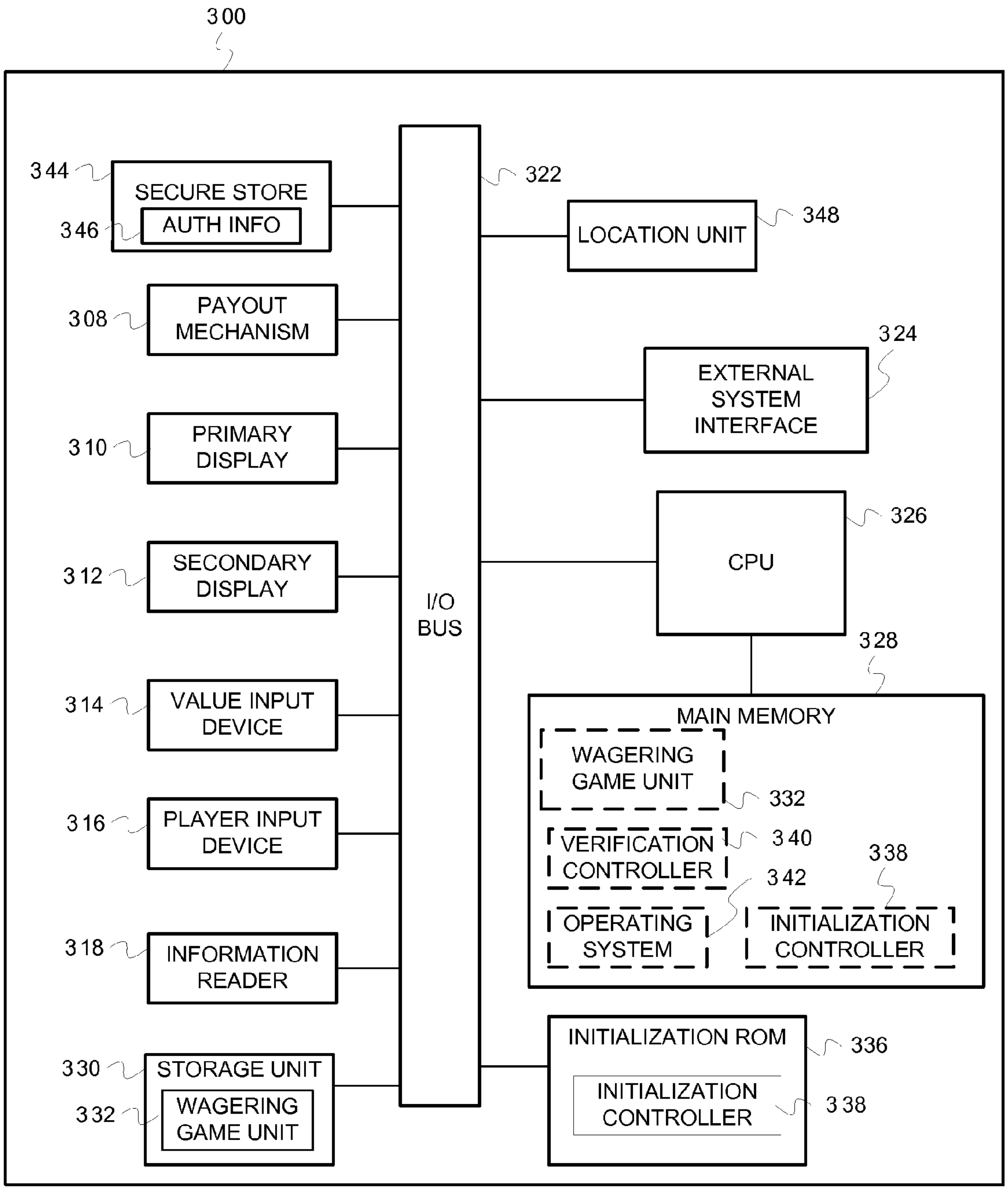
FIG. 3 is a block diagram illustrating an architecture for a wagering game machine, according to example embodiments of the invention.

FIG. 3 is a block diagram illustrating an architecture for a wagering game machine, according to example embodiments of the invention. The wagering game machine 300 can be a mobile model, stationary model, etc. As shown in FIG. 3, the wagering game machine 300 includes a central processing unit (CPU) 326 connected to main memory 328. The CPU 326 can include any suitable processor, such as an Intel® Pentium processor, Intel® Core 2 Duo processor, AMD Opteron™ processor, or UltraSPARC processor.

The main memory 328 includes an initialization controller 338, operating system 342, verification controller 340, and wagering game unit 332. In some embodiments, the initialization controller 338, operating system 342, and verification controller 340 are loaded into the main memory 328 during an initialization process (see discussion of FIGS. 4 & 5). In some embodiments, the initialization controller 338 controls a boot process during which the wagering game machine 300 receives the operating system 342 from a trusted initialization server via a secure network link. After booting, the operating system 342 can procure the verification controller 340, which can verify authenticity of all content on the wagering game machine 300 (e.g., content on the storage unit 330). After initialization is complete, the wagering game unit 332 can present wagering games, such as video poker, video black jack, video slots, video lottery, etc., in whole or part.

The CPU 326 is also connected to an input/output (I/O) bus 322, which can include any suitable bus technologies, such as an AGTL+ frontside bus and a PCI backside bus. The I/O bus 322 is connected to an external system interface 324, payout mechanism 308, primary display 310, secondary display 312, value input device 314, player input device 316, information reader 318, storage unit 330, initialization read only memory (ROM) 336, and secure store 344. In some embodiments, the initialization ROM 336 loads the initialization controller 338 into main memory 328 during an initialization process. In some embodiments, the initialization controller 338 can include a basic input/output system (BIOS) (e.g., from Phoenix Technologies, American Megatrends, or others) and network booting extensions. In some embodiments, the network booting extensions can employ PXE operations to acquire an operating system from the boot server 230. In some embodiments, the initialization ROM 336 and initialization controller 338 cannot be reconfigured (e.g., through a programmable configuration process) to cause the wagering game machine 300 to receive an operating system from anywhere other than a trusted initialization server. As a result, attackers would likely have to physically remove and/or alter the initialization ROM 336 to change the initialization process.

The secure store 344 can securely store authentication credentials for verifying that the wagering game machine's components are authentic. For example, the secure store 344 can securely store a digitally signed hash of the initialization controller 338. Additionally, the secure store 344 can securely store "master" key sets and digital certificate sets for use generating cryptographic keys and certificates. In some embodiments, the secure store 344 can include a trusted platform module (TPM) chip.

The I/O bus 322 is also connected to a location unit 348. The location unit 348 can create information that indicates the wagering game machine's location in a casino. In some embodiments, the location unit 348 includes a global positioning system (GPS) receiver that can determine the wagering game machine's location using GPS satellites. In other embodiments, the location unit 348 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location.

In some embodiments, the wagering game machine 306 can include additional peripheral devices and/or more than one of each component shown in FIG. 3. For example, in some embodiments, the wagering game machine 306 can include multiple external system interfaces 324 and/or multiple CPUs 326. In some embodiments, any of the components can be integrated or subdivided. Although some components are depicted as software, any component of the wagering game machine 300 can be implemented as hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel. Moreover, some embodiments perform less than all the operations shown in the flow diagrams.

Figure 4:
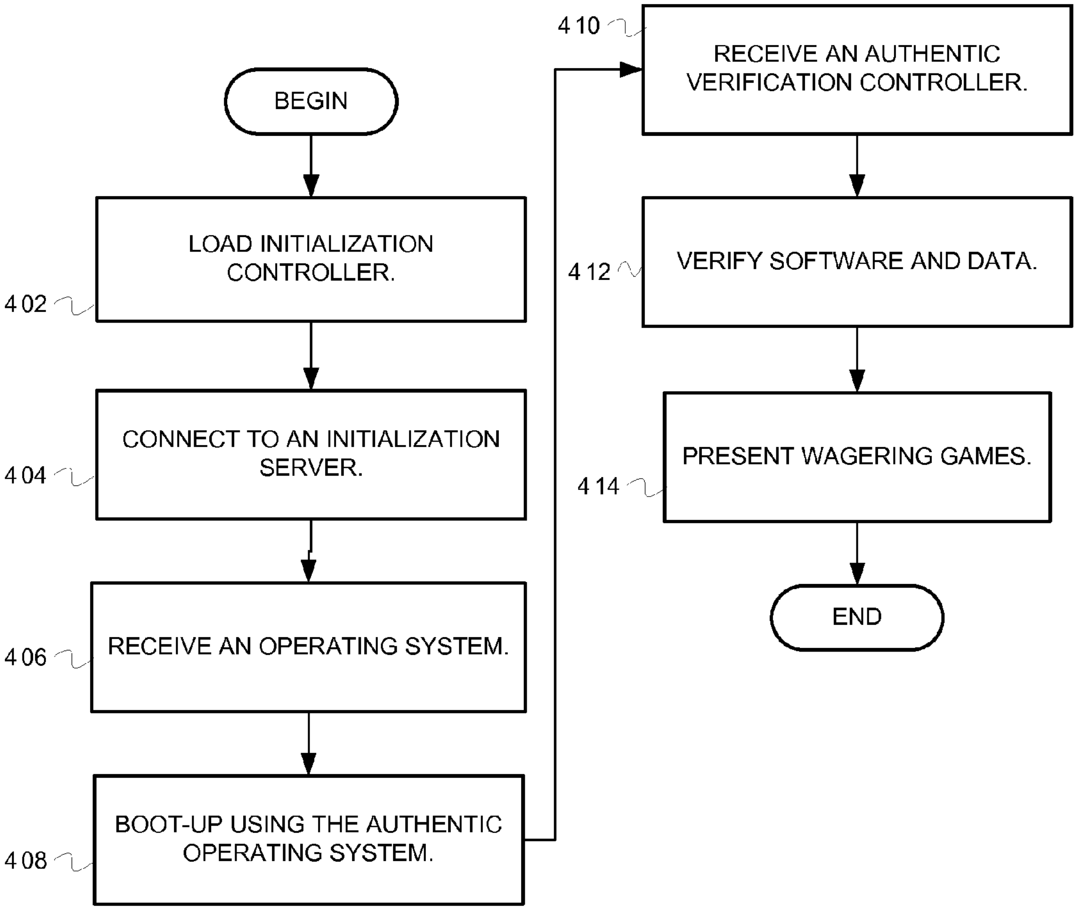
FIG. 4 is a flow diagram illustrating operations for initializing a wagering game machine, according to some embodiments of the invention.

FIG. 4 is a flow diagram illustrating operations for initializing a wagering game machine, according to some embodiments of the invention. The flow 400 will be described with reference to the embodiments shown in FIGS. 2 & 3. The flow 400 begins at block 402.

At block 402, the wagering game machine's CPU 326 loads the initialization controller 338 from the initialization ROM 336 into the main memory 328. As noted above, some embodiments of the initialization controller 338 include BIOS and network booting extensions that operate according to PXE. The flow continues at block 404.

At block 404, the initialization controller 330 connects to an initialization server 226. In some embodiments, the initialization controller 330 establishes a connection to the initialization server's boot server 230 using extended Dynamic Host Configuration Protocol (DHCP) commands, which are defined in Intel Corporation's Preboot Execution Environment. The flow continues at block 406.

At block 406, the wagering game machine 300 receives an operating system 342 from an initialization server's boot server 230. In some embodiments, the wagering game machine 300 receives an operating system image 220, which includes the operating system 342 in a compressed format. In some embodiments, the wagering game machine 300 initially receives a bootstrap program which later fetches other operating system components. The wagering game machine 300 can receive the operating system 342 using the Trivial File Transfer Protocol (TFTP) or any other suitable protocol. The flow continues at block 408.

At block 408, the initialization controller 338 boots the wagering game machine 300 using the operating system 342. In some embodiments, the initialization controller 338 decompresses an operating system image to result in the operating system 342. In other embodiments, the operating system image decompresses itself to result in the operating system 342. The flow 400 continues at block 410.

At block 410, the wagering game machine 300 receives a verification controller 340. In some embodiments, the operating system 342 requests the verification controller 340 after boot-up. The flow continues at block 412.

At block 412, the verification controller 340 verifies content on the wagering game machine 300. For example, the verification controller 340 verifies digital signatures and/or other authentication information associated with software (e.g., the wagering game unit 332) and data in the storage unit 330, main memory 328, and the initialization ROM 336. In some embodiments, the verification controller 340 can verify authenticity of wagering game machine components by: 1) determining whether the components' credentials (e.g., digital certificates) match credentials received from the initialization server 226; 2) determining the components' credentials and sending them to the initialization server for comparison, where the initialization server 226 can notify the verification controller 340 of the results; or 3) determining the components' credentials and comparing them to credentials stored in the secure store 344. The flow continues at block 414.

At block 414, the wagering game unit 332 presents wagering games. From block 414, the flow ends.

Figure 5:
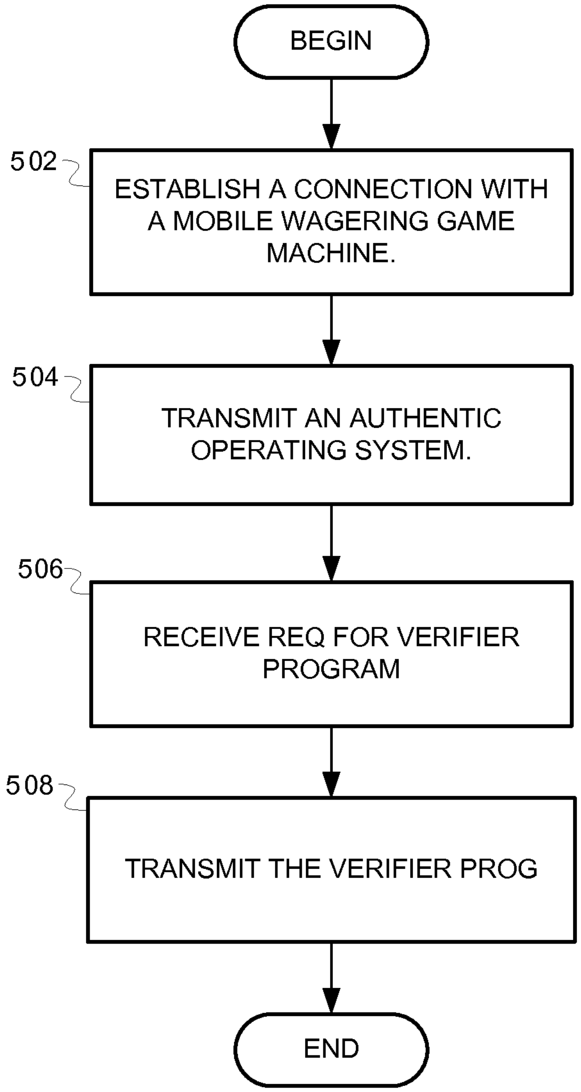
FIG. 5 is a flow diagram illustrating operations for delivering an operating system components and other content over a network, according to some embodiments of the invention.

While FIG. 4 describes operations typically performed by wagering game machines, the discussion of FIG. 5 describes operations typically performed by an initialization server.

FIG. 5 is a flow diagram illustrating operations for delivering an operating system components and other content over a network, according to some embodiments of the invention. The flow 500 will be described with reference to the wagering game network of FIG. 3. The flow 500 begins at block 502.

At block 502, the initialization server's boot server 230 establishes a connection with a wagering game machine 202. In some embodiments, the server 230 establishes the connection using PXE messages. The flow continues at block 504.

At block 504, the boot server 230 transmits an authentic operating system (e.g., in the form of an operating system image 220) to the wagering game machine 202. The boot server 230 can use TFTP to transmit the operating system. The flow continues at block 506.

At block 506, initialization server 226 receives a request for in a verification controller. The flow continues at block 508.

At block 508, initialization server 226 transmits the verification controller image 222 to the wagering game machine 202. As noted above, wagering game machine 202 can use a verification controller to the authenticity of its content. In some embodiments, the initialization server 226 assists verification controllers in verifying authenticity of wagering game machine components. As noted above (see discussion of block 412), the initialization server 226 can compare credentials received from wagering game machines with trusted credentials. The initialization server 226 can notify the wagering game machines of the results. From block 508, the flow ends.

More about Wagering Game Machines

Figure 6:
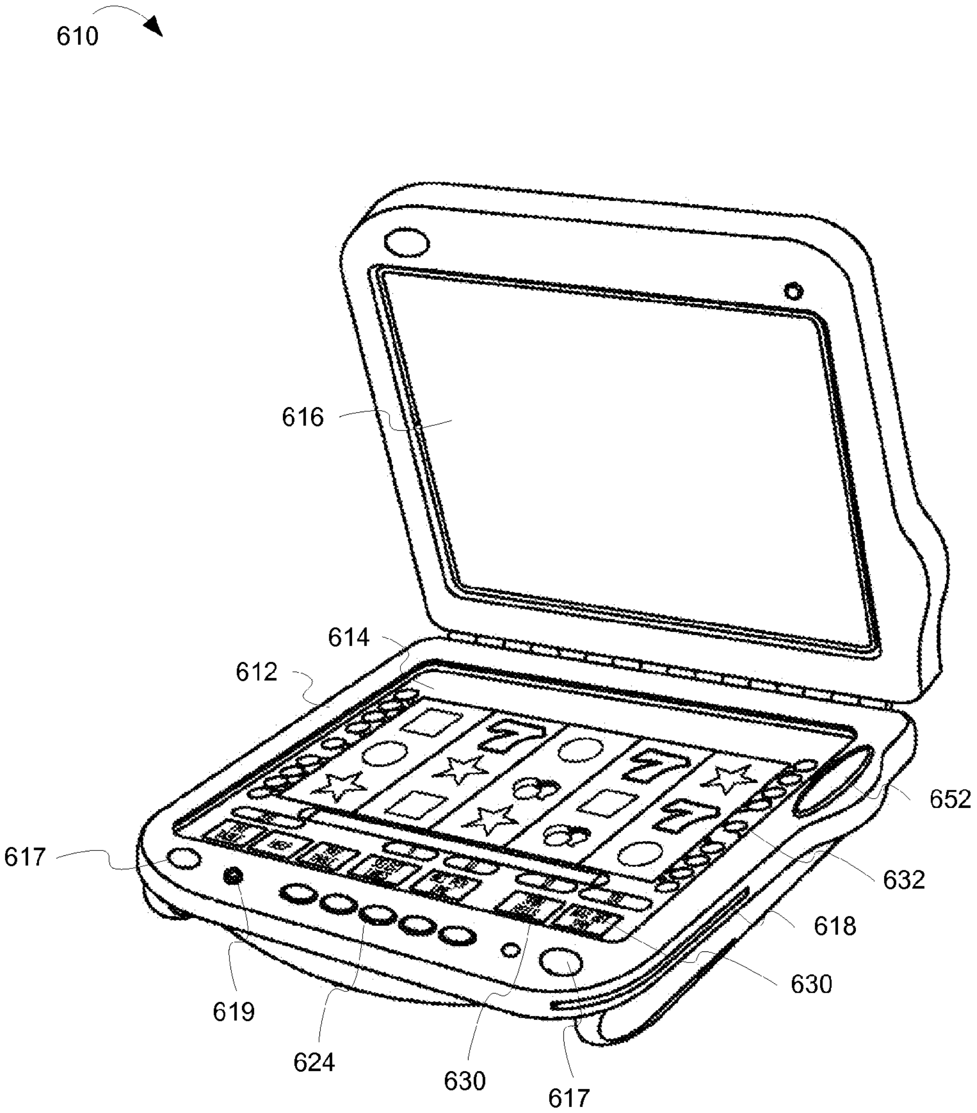
FIG. 6 shows an example embodiment of a wagering game machine, according to some embodiments of the invention.

FIG. 6 shows an example embodiment of a wagering game machine, according to some embodiments of the invention. Like free standing wagering game machines, in a handheld or mobile form, the wagering game machine 610 can include any suitable electronic device configured to play a video casino games such as blackjack, slots, keno, poker, blackjack, and roulette. The wagering game machine 610 comprises a housing 612 and includes input devices, including a value input device 618 and a player input device 624. For output, the wagering game machine 610 includes a primary display 614, a secondary display 616, one or more speakers 617, one or more player-accessible ports 619 (e.g., an audio output jack for headphones, a video headset jack, etc.), and other conventional I/O devices and ports, which may or may not be player-accessible. In the embodiment depicted in FIG. 6, the wagering game machine 610 comprises a secondary display 616 that is rotatable relative to the primary display 614. The optional secondary display 616 can be fixed, movable, and/or detachable/attachable relative to the primary display 614. Either the primary display 614 and/or secondary display 616 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 618 can comprise, for example, a slot located on the front, side, or top of the casing 612 configured to receive credit from a stored-value card (e.g., casino card, smart card, debit card, credit card, etc.) inserted by a player. The player-accessible value input device 618 can also comprise a sensor (e.g., an RF sensor) configured to sense a signal (e.g., an RF signal) output by a transmitter (e.g., an RF transmitter) carried by a player. The player-accessible value input device 618 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 610.

Still other player-accessible value input devices 618 can require the use of touch keys 630 on the touch-screen display (e.g., primary display 614 and/or secondary display 616) or player input devices 624. Upon entry of player identification information and, preferably, secondary authorization information (e.g., a password, PIN number, stored value card number, predefined key sequences, etc.), the player can be permitted to access a player's account. As one potential optional security feature, the wagering game machine 610 can be configured to permit a player to only access an account the player has specifically set up for the wagering game machine 610. Other conventional security features can also be utilized to, for example, prevent unauthorized access to a player's account, to minimize an impact of any unauthorized access to a player's account, or to prevent unauthorized access to any personal information or funds temporarily stored on the wagering game machine 610.

The player-accessible value input device 618 can itself comprise or utilize a biometric player information reader which permits the player to access available funds on a player's account, either alone or in combination with another of the aforementioned player-accessible value input devices 618. In an embodiment wherein the player-accessible value input device 618 comprises a biometric player information reader, transactions such as an input of value to the wagering game machine 610, a transfer of value from one player account or source to an account associated with the wagering game machine 610, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 618 comprising a biometric player information reader can require a confirmatory entry from another biometric player information reader 652, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 618 can be provided remotely from the wagering game machine 610.

The player input device 624 comprises a plurality of push buttons on a button panel for operating the wagering game machine 610. In addition, or alternatively, the player input device 624 can comprise a touch screen mounted to a primary display 614 and/or secondary display 616. In one aspect, the touch screen is matched to a display screen having one or more selectable touch keys 630 selectable by a user's touching of the associated area of the screen using a finger or a tool, such as a stylus pointer. A player enables a desired function either by touching the touch screen at an appropriate touch key 630 or by pressing an appropriate push button on the button panel. The touch keys 630 can be used to implement the same functions as push buttons. Alternatively, the push buttons 626 can provide inputs for one aspect of the operating the game, while the touch keys 630 can allow for input needed for another aspect of the game. The various components of the wagering game machine 610 can be connected directly to, or contained within, the casing 612, as seen in FIG. 6, or can be located outside the casing 612 and connected to the casing 612 via a variety of wired (tethered) or wireless connection methods. Thus, the wagering game machine 610 can comprise a single unit or a plurality of interconnected (e.g., wireless connections) parts which can be arranged to suit a player's preferences.

The operation of the basic wagering game on the wagering game machine 610 is displayed to the player on the primary display 614. The primary display 614 can also display the bonus game associated with the basic wagering game. The primary display 614 preferably takes the form of a high resolution LCD, a plasma display, an LED, or any other type of display suitable for use in the wagering game machine 610. The size of the primary display 614 can vary from, for example, about a 2-3" display to a 15" or 17" display. In at least some embodiments, the primary display 614 is a 7"-10" display. In some embodiments, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 614 and/or secondary display 616 can have a 16:9 aspect ratio or other aspect ratio (e.g., 4:3). The primary display 614 and/or secondary display 616 can also each have different resolutions, different color schemes, and different aspect ratios.

As with the free standing embodiments a wagering gaming machine, a player begins play of the basic wagering game on the wagering game machine 610 by making a wager (e.g., via the value input device 618 or an assignment of credits stored on the handheld gaming machine via the touch screen keys 630, player input device 624, or buttons 626) on the wagering game machine 610. In some embodiments, the basic game can comprise a plurality of symbols arranged in an array, and includes at least one payline 632 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 618 of the wagering game machine 610 can double as a player information reader 652 that allows for identification of a player by reading a card with information indicating the player's identity (e.g., reading a player's credit card, player ID card, smart card, etc.). The player information reader 652 can alternatively or also comprise a bar code scanner, RFID transceiver or computer readable storage medium interface. In some embodiments, the player information reader 652 comprises a biometric sensing device.

General

This detailed description describes specific examples in the drawings and illustrations. These examples are described in sufficient detail to enable those skilled in the art to practice the inventive subject matter, and serve to illustrate how the inventive subject matter can be applied to various embodiments. Other embodiments are included within the inventive subject matter, as logical, mechanical, electrical, and other changes can be made to the example embodiments described herein. Features or limitations of various embodiments, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for initializing a wagering game machine comprising:

receiving, in the wagering game machine from a remote trusted server over a secure network connection, an operating system image and a verification controller configured to authenticate content stored on the wagering game machine;

booting the wagering game machine using a portion of the operating system image;

authenticating, via the verification controller, content stored on the wagering game machine; and presenting, using the content, wagering games on the wagering game machine.

2. The method of claim 1 further comprising: loading a basic input output system from a read only memory, wherein the loading occurs before the receiving.

3. The method of claim 1, wherein before performing the operations of the method of claim 1, the wagering game machine includes the content, and does not include a boot record for booting the wagering game machine.

4. The method of claim 1, wherein the content includes software for preparing components of the wagering game machine for booting.

5. The method of claim 1, wherein the wagering game machine cannot boot-up before receiving the operating system image.

6. The method of claim 1, wherein the authenticating includes, determining authentication credentials associated with components of the wagering game machine; and transmitting the authentication credentials over the secure network connection for comparison with trusted credentials.

7. A system comprising:

a wagering game machine including one or more processors;

one or more non-transitory machine readable memory devices including program code that when executed by at least one of the processors causes the at least one of the processors to perform operations including procuring an operating system image via a network and to boot-up the wagering game machine using the operating system image; and presenting wagering games after boot-up; and an initialization server including one or more processors; and one or more non-transitory machine readable memory devices including program code that when executed by at least one of the processors causes the at least one of the processors to perform operations including transmitting the operating system image over the network, wherein the operating system image is configured to request, via the network, a verification controller configured to verify authenticity of content stored on the wagering game machine.

8. The system of claim 7, wherein the initialization server further includes program code configured to perform operations including transmitting the verification controller to the wagering game machine.

9. The system of claim 7, further comprising:

a gaming center including one or more processors; and one or more non-transitory machine readable memory devices including program code that when executed by at least one of the processors causes the at least one of the processors to perform operations including connecting the wagering game machine to the network.

10. The system of claim 9, wherein the operations of the gaming center further including charging a battery in the wagering game machine.

11. The system of claim 9, wherein the operations of the gaming center further include storing the wagering game machine; and releasing the wagering game machine as part of a check-out process.

12. The system of claim 7, wherein the wagering game machine is a mobile model.

13. A wagering game machine comprising:

one or more processors;

one or more non-transitory machine readable memory devices including program code that when executed by at least one of the processors causes the at least one of the processors to perform operations for initializing a wagering game machine, the operations comprising receiving, in the wagering game machine from a remote trusted server over a secure network connection, an operating system image and a verification controller configured to authenticate content stored on the wagering game machine;

booting the wagering game machine using a portion of the operating system image;

authenticating, via the verification controller, content stored on the wagering game machine; and presenting, using the content, wagering games on the wagering game machine.

14. The apparatus of claim 13, wherein the operations further comprise: loading a basic input output system from a read only memory, wherein the loading occurs before the receiving.

15. The apparatus of claim 13, wherein before performing the operations, the wagering game machine includes the content, and does not include a boot record for booting the wagering game machine.

16. The method of claim 13, wherein the content includes software for preparing components of the wagering game machine for booting.

17. The method of claim 13, wherein the wagering game machine cannot boot-up before receiving the operating system image.

* * * * *